(12) United States Patent
Kichikawa

(10) Patent No.: US 10,079,950 B2
(45) Date of Patent: Sep. 18, 2018

(54) PRINTING SYSTEM INCLUDES A TERMINAL AND A PRINTER TO DETECT USER ACTION FOR CHANGING DISPLAY AREA OF AN ELECTRONIC PAGE DISPLAYED ON A DISPLAY, AND CREATE HISTORY INFORMATION OF THE USER ACTION

(71) Applicant: FUJI XEROX CO., LTD., Tokyo (JP)

(72) Inventor: Tomohiro Kichikawa, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 89 days.

(21) Appl. No.: 15/056,262

(22) Filed: Feb. 29, 2016

(65) Prior Publication Data

US 2017/0048409 A1    Feb. 16, 2017

(30) Foreign Application Priority Data

Aug. 11, 2015  (JP) .................................. 2015-159034

(51) Int. Cl.
*G06K 15/02*    (2006.01)
*H04N 1/00*    (2006.01)
(Continued)

(52) U.S. Cl.
CPC ....... *H04N 1/00973* (2013.01); *G06F 3/1204* (2013.01); *G06F 3/1219* (2013.01);
(Continued)

(58) Field of Classification Search
None
See application file for complete search history.

(56) References Cited

U.S. PATENT DOCUMENTS 9,047,035 B2    6/2015  Ito
2009/0327408 A1*  12/2009  Nagase ................. H04L 67/303
                                          709/203
(Continued)

FOREIGN PATENT DOCUMENTS

| JP | 2012-198784 A | 10/2012 |
| JP | 2013-045185 A | 3/2013 |
| JP | 2014-177012 A | 9/2014 |

OTHER PUBLICATIONS

Hiramatsu Naoko; "Print System, Print Device, Portable Terminal Device, Print Method, and Print Program" JPO; pp. 1-36.*
(Continued)

*Primary Examiner* — Benny Q Tieu
*Assistant Examiner* — Haris Sabah
(74) *Attorney, Agent, or Firm* — Sughrue Mion, PLLC

(57) ABSTRACT

A printing system includes a terminal and a printer communicable with the terminal. The terminal includes: an operation history recording unit that detects an operation performed by a user for changing a display area of an electronic document displayed on a screen of the terminal, and records operation history information that includes type information about the operation; and an instruction transmitting unit that transmits, to the printer, print instruction information including the operation history information recorded by the operation history recording unit and document information for identifying the electronic document. The printer includes: an instruction receiving unit that receives the print instruction information from the terminal; and a print controller that determines, in accordance with the operation history information included in the received print instruction information, a print area of the electronic document identified by using the document information, and performs control so as to print the determined print area.

6 Claims, 13 Drawing Sheets

(51) Int. Cl.
*G06F 3/12* (2006.01)
*H04N 1/23* (2006.01)
*H04N 1/32* (2006.01)

(52) U.S. Cl.
CPC .......... *G06F 3/1253* (2013.01); *G06F 3/1265* (2013.01); *G06F 3/1285* (2013.01); *H04N 1/00204* (2013.01); *H04N 1/00464* (2013.01); *H04N 1/2338* (2013.01); *H04N 1/32101* (2013.01); *G06F 3/1246* (2013.01); *H04N 2201/0094* (2013.01)

(56) References Cited

U.S. PATENT DOCUMENTS

| | | | |
|---|---|---|---|
| 2011/0242600 A1 | 10/2011 | Yanagawa | |
| 2013/0016121 A1* | 1/2013 | Azuchi | G06F 3/04883 345/619 |
| 2014/0126013 A1* | 5/2014 | Shin | G06F 3/1204 358/1.15 |
| 2015/0091830 A1* | 4/2015 | Miyazaki | G06F 3/0488 345/173 |

OTHER PUBLICATIONS

Machine translation in English of JP Pub 2013-0145185 to Hiramatsu Naoko.*
Communication dated Jan. 5, 2017 from the European Patent Office in counterpart Application No. 16160832.8.

* cited by examiner

FIG. 3

| OPERATION IDENTIFIER | URL IDENTIFIER | TYPE | OPERATION AREA |
|---|---|---|---|
| OPE001 | URL001 | FLICK | begin:id=0100,end:id=0200 |

FIG. 4

| URL IDENTIFIER | URL |
|---|---|
| URL001 | http://www.printing.ne.jp/ |

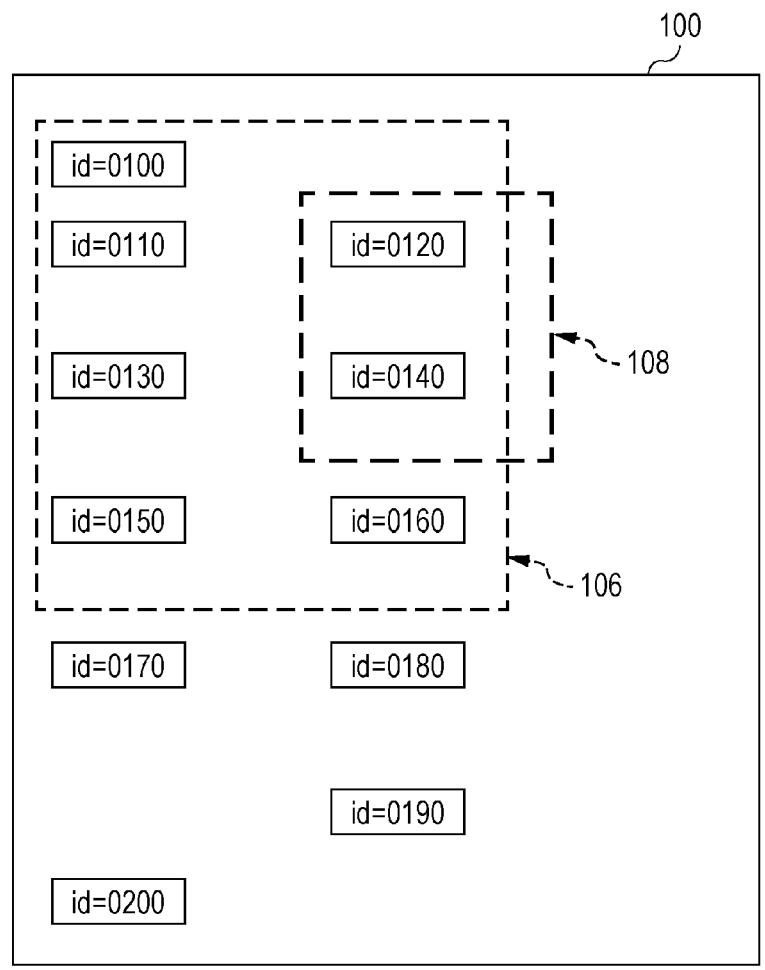

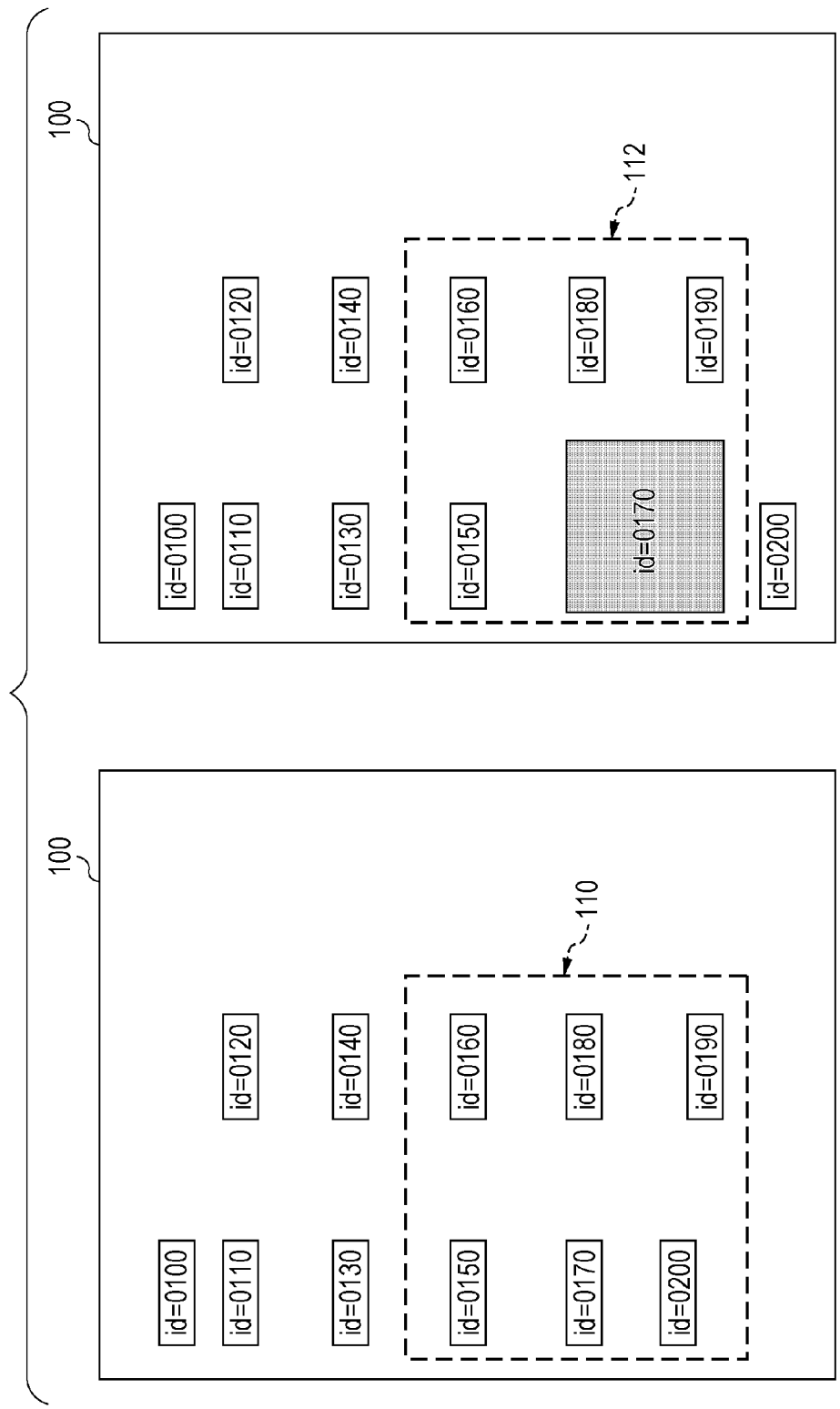

| OPERATION IDENTIFIER | URL IDENTIFIER | TYPE | OPERATION AREA |
|---|---|---|---|
| OPE003 | URL001 | TAPPING | target:id=0170 |

FIG. 15

| OPERATION IDENTIFIER | URL IDENTIFIER | OPERATION TYPE | OPERATION AREA | INTERVAL TIME (SEC.) |
|---|---|---|---|---|
| OPE001 | URL001 | FLICK | begin:id=0050,end:id=0150 | 1.2 |
| OPE002 | URL001 | PINCH | begin:id=0120,end:id=0140 | 7.5 |
| OPE003 | URL001 | FLICK | begin:id=0120,end:id=0200 | 0.5 |
| OPE004 | URL001 | TAPPING | target:id=0170 | 10.2 |
| ... | ... | ... | ... | |

PRINTING SYSTEM INCLUDES A TERMINAL AND A PRINTER TO DETECT USER ACTION FOR CHANGING DISPLAY AREA OF AN ELECTRONIC PAGE DISPLAYED ON A DISPLAY, AND CREATE HISTORY INFORMATION OF THE USER ACTION

CROSS-REFERENCE TO RELATED APPLICATIONS

This application is based on and claims priority under 35 USC 119 from Japanese Patent Application No. 2015-159034 filed Aug. 11, 2015.

BACKGROUND (i) Technical Field

The present invention relates to a printing system, a printer, and a non-transitory computer readable medium.

(ii) Related Art

It is common practice to view a web page (hereinafter also simply referred to as "page") on a portable terminal, such as a smartphone or a tablet terminal. A portable terminal has a display area that is notably smaller than that of a personal computer (PC), and therefore, has poor viewability such that, when a page intended for a PC is displayed as is, characters are too small to read, for example. Accordingly, a large number of web sites provide pages intended for a PC and those intended for a portable terminal.

Further, it is possible to instruct a printer to print a page that a user is viewing on a portable terminal. In this case, when a page intended for a portable terminal is printed as is, the image may be blurry or other inconveniences may occur, and therefore, the printer obtains and prints a page intended for a PC.

A page intended for a portable terminal is often modified in order to increase viewability on a small screen such that only headings are displayed for some of the elements on the page and, when a user gives an instruction to expand any of the headings, the content of the corresponding element is displayed. When the uniform resource locator (URL) of such a page intended for a portable terminal is passed to a printer to simply instruct the printer to print the page, the printer obtains and prints a page intended for a PC that corresponds to the URL. The page intended for a PC is not modified as described above, and the content of all elements is displayed uniformly. As a result, when the page is printed as is, the content of the page which is much larger than that expected by the user viewing the page on a portable terminal may be printed.

SUMMARY

According to an aspect of the invention, there is provided a printing system including a terminal and a printer that is communicable with the terminal. The terminal includes an operation history recording unit and an instruction transmitting unit. The operation history recording unit detects an operation performed by a user for changing a display area of an electronic document displayed on a display screen of the terminal, and records operation history information that includes type information about the operation. The instruction transmitting unit transmits, to the printer, print instruction information including the operation history information recorded by the operation history recording unit and document information for identifying the electronic document. The printer includes an instruction receiving unit and a print controller. The instruction receiving unit receives the print instruction information from the terminal. The print controller determines, in accordance with the operation history information included in the received print instruction information, a print area of the electronic document identified by using the document information, and performs control so as to print the determined print area.

BRIEF DESCRIPTION OF THE DRAWINGS

An exemplary embodiment of the present invention will be described in detail based on the following figures, wherein:

FIG. 3 is a diagram illustrating an example of operation history information about a flick operation;

FIG. 4 is a diagram illustrating an example of URL information;

FIG. 5 is a diagram for describing a pinch operation;

FIG. 6 is a diagram illustrating an example of operation history information about a pinch operation;

FIG. 7 is a diagram for describing a tap operation;

FIG. 15 is a diagram illustrating an example of a list of pieces of operation history information according to the modification.

DETAILED DESCRIPTION

An example of a configuration of a printing system according to an exemplary embodiment is described with reference to FIG. 1.

Figure 1:
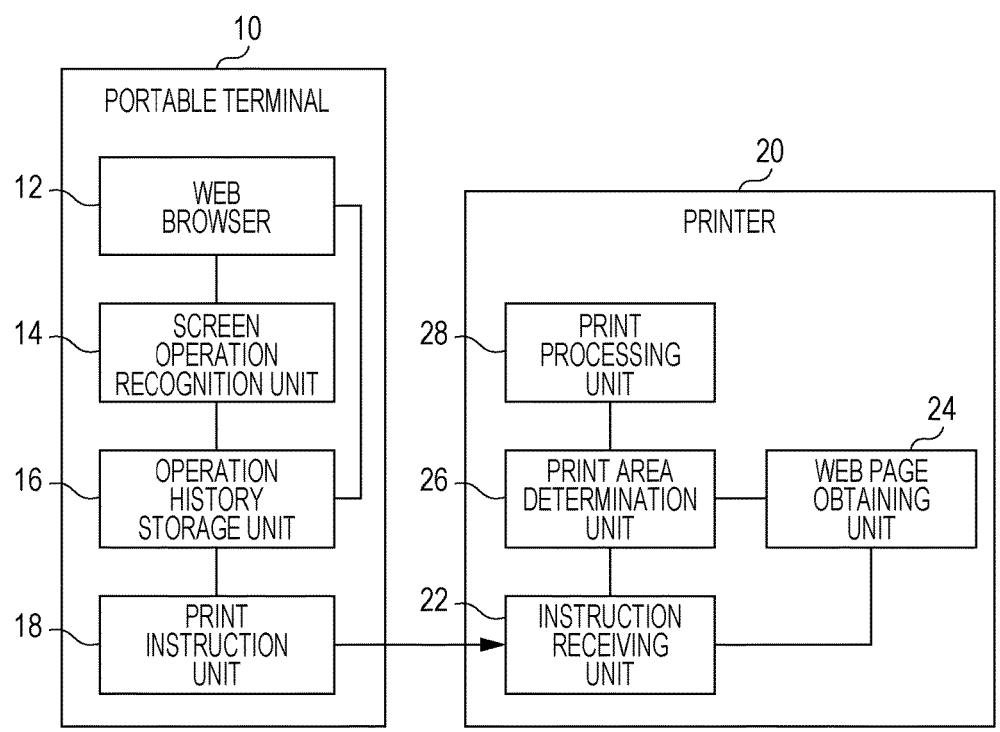
FIG. 1 is a diagram illustrating an example of a configuration of a printing system according to an exemplary embodiment.

As illustrated in FIG. 1, the printing system includes a portable terminal 10 and a printer 20. The portable terminal 10 communicates with the printer 20 by using a short-range wireless connection based on WiFi or the like or by using a connection over the Internet via a mobile telephone network or the like.

The portable terminal 10 is an information processing apparatus, such as a smartphone or a tablet terminal, which a user carries. The portable terminal 10 has a function of connecting to the Internet via a mobile telephone network, a wireless local area network (LAN), or the like. The portable terminal 10 includes a web browser 12, a screen operation recognition unit 14, an operation history storage unit 16, and a print instruction unit 18.

The web browser 12 displays on a screen of the portable terminal 10 a web page intended for a portable terminal obtained from a web server on the Internet. The web browser 12 changes a portion of the obtained web page which is displayed on the screen in accordance with a user operation input into an input device (touch panel screen, for example) of the portable terminal 10. Hereinafter, as a typical example, a description is given of a case where the portable terminal 10 is a smartphone and operations performed on a web page displayed on the screen are various touch operations on the touch panel, for example. Note that, as seen from a description given below, a scheme of this exemplary embodiment is also applicable to a case where operations relating to the screen display are performed by using hardware keys, such as arrow keys, an enter key, and so on.

The screen operation recognition unit 14 recognizes a user operation performed on a web page displayed on the screen.

Touch operations on the touch panel screen include various types of operations, such as a flick, a pinch, and tapping, for example. For example, a flick is an operation of touching a screen with a finger and lightly flicking the finger and is used to scroll a displayed portion in a case of viewing a web page. A pinch is an operation of pinching a portion of interest on the screen with two fingers and includes a pinch-in operation of bringing the two fingers closer together and a pinch-out operation of spreading the two fingers apart. A pinch-in operation is used to reduce the size of the screen display (in other words, to extend an area displayed on the screen), and a pinch-out operation is used to enlarge the screen display. Tapping is an operation of lightly tapping the screen with a finger and corresponds to a click operation with a mouse. In a case of web browsing, when a heading on a displayed page is tapped, an article or an image that corresponds to the heading is displayed on the screen.

The screen operation recognition unit 14 recognizes, for example, the type, target position, direction, and amount of an operation performed by a user on a touch panel screen on which a web page is displayed, and communicates information about the recognized operation to the web browser 12. The web browser 12 moves or changes a portion of the web page which is displayed on the screen in accordance with the communicated information. The information about the operation recognized by the screen operation recognition unit 14 is stored in the operation history storage unit 16. The operating system of the portable terminal 10 provides the functions of the screen operation recognition unit 14, for example.

The operation history storage unit 16 generates and stores history information about an operation performed by a user while the user is viewing a web page. Specifically, the operation history storage unit 16 retains, as history information about each operation, the type of operation (flick, pinch, tapping, and so on) and information for identifying one or more elements on the web page, which are targets of the operation. The operation history storage unit 16 is able to obtain the type of operation from the screen operation recognition unit 14 and to obtain information about elements that are targets of the operation from the web browser 12.

The print instruction unit 18 receives a print instruction from a user viewing a web page and transmits print instruction data to the printer 20 in accordance with the print instruction. The print instruction data includes the URL of the web page that the user is viewing and operation history information about an operation performed on the page while the user is viewing the page.

The operation history storage unit 16 and the print instruction unit 18 may be implemented as functions that are built in the web browser 12. Alternatively, an application that is installed on the portable terminal 10 and receives a print instruction may have the functions of the operation history storage unit 16 and the print instruction unit 18.

The printer 20 is an apparatus having a print function and a communication function (wireless communication function, for example) for communicating with the portable terminal 10. Examples of the printer 20 include a paid multifunction machine (apparatus having functions of a copy machine, printer, scanner, and so on) which is installed in a convenience store, for example, but are not limited to this as a matter of course. The printer 20 includes an instruction receiving unit 22, a web page obtaining unit 24, a print area determination unit 26, and a print processing unit 28 as a mechanism for performing printing in accordance with print instruction data from the portable terminal 10.

The instruction receiving unit 22 receives print instruction data transmitted from the portable terminal 10.

The web page obtaining unit 24 uses a URL in the received print instruction data and obtains from the Internet a web page intended for a PC that corresponds to the URL.

The print area determination unit 26 determines an area on the web page obtained by the web page obtaining unit 24 which is to be printed ("print area") on the basis of operation history data in the print instruction data.

The print processing unit 28 generates an image of the print area on the web page, the print area having been determined by the print area determination unit 26, and performs a process for printing the image on a sheet.

Now, operation history information generated and stored by the operation history storage unit 16 is described for each operation type.

Figure 2:
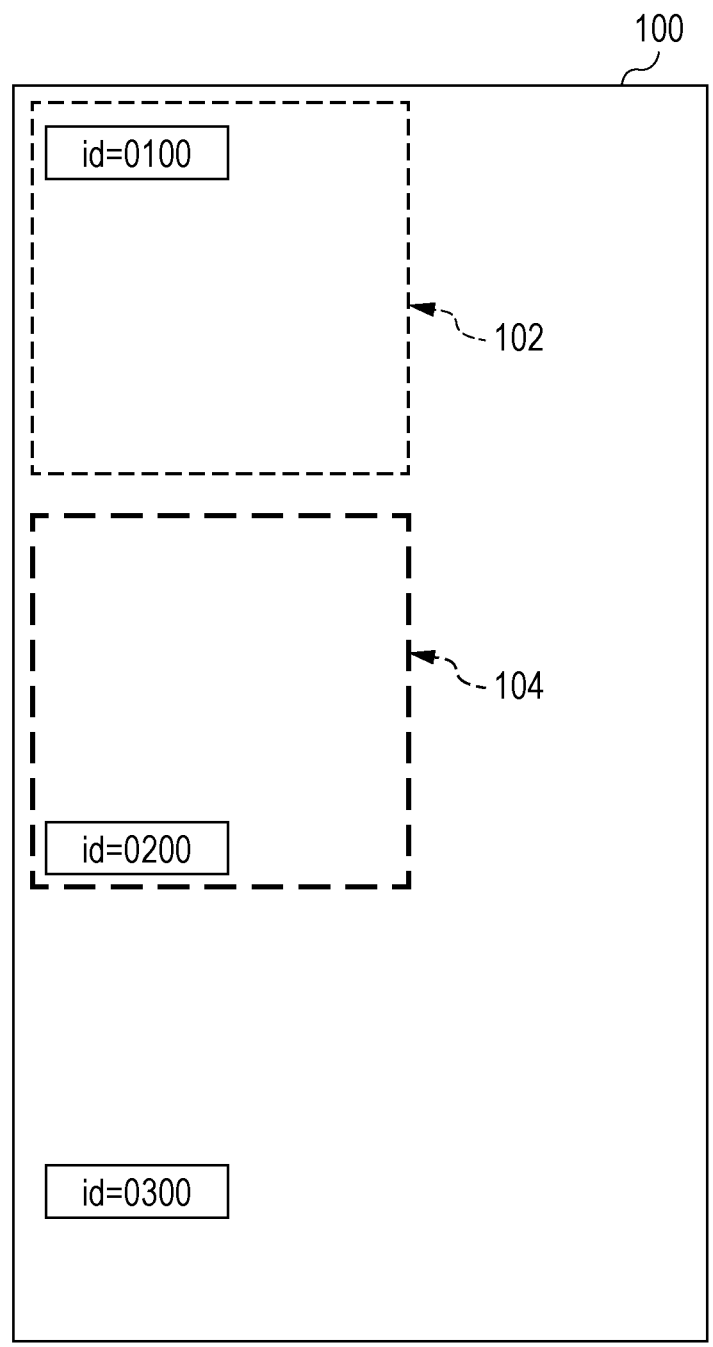
FIG. 2 is a diagram for describing a flick operation.

FIG. 2 is a diagram for describing a change on a screen resulting from a flick operation. It is assumed that, on a web page 100 that the web browser 12 retains as a display target, an area 102 is actually displayed on the screen of the portable terminal 10 at a certain time point. At an upper end position of the area 102, an element having an id attribute that has a value of 0100 is located. As is known, a web page is a document described using HyperText Markup Language (HTML) and is constituted by one or more elements. An id attribute is a unique identifier assigned to an element on a web page and is described in a tag that defines the element. In this state, it is assumed that a user performs a flick operation of moving their finger upward on the screen to scroll the display area on the web page 100 upward and that an area 104 is consequently displayed. It is further assumed that an element having an id equal to 0200 is located at a lower end position of the area 104. When such a flick operation is performed, the operation history storage unit 16 creates operation history information illustrated in FIG. 3.

The operation history information illustrated in FIG. 3 includes items, namely, an operation identifier, a URL identifier, a type, and an operation area. The operation identifier is an identifier for uniquely identifying each operation performed by a user while the user is viewing a web page. The URL identifier is an identifier for uniquely identifying URL information (see FIG. 4) about the web page that the user is viewing. The type is the type of operation and has a value "flick" in the example in FIG. 3. The operation area item is information for identifying an area on the web page on which the operation is performed. In the example in FIG. 3, the operation area is represented by a set of the id attribute value of an element located at an end portion of an area displayed on the screen at the start of the flick operation ("begin" in FIG. 3) and the id attribute value of an element located at an end portion of an area displayed on the screen at the end of the flick operation ("end" in FIG. 3). Note that the end of a flick operation is the time point at which scrolling on the screen which has started at the speed of the flick operation stops as the inertia is lost. In a case of scrolling the display upward (example in FIG. 2), a set of the id of an element located at an upper end of an area displayed at the start of the operation and the id of an element located at a lower end of an area displayed at the end of the operation is recorded as the "operation area". In a case of scrolling the display downward, a set of the id of an element located at a lower end of an area displayed at the start of the operation and the id of an element located at an upper end of an area displayed at the end of the operation is recorded as the "operation area".

Note that the operation history storage unit 16 generates and stores URL information illustrated in FIG. 4 when the web browser 12 downloads a web page, for example. The URL information includes the value of the URL of the web page and a URL identifier uniquely assigned to the URL. Operation history information about an operation performed on the web page includes the URL identifier as information indicating that the operation is an operation performed on the web page (see FIG. 3).

FIG. 5 is a diagram for describing a change on a screen resulting from a pinch operation. In the example in FIG. 5, it is assumed that, on the web page 100, an area 106 is actually displayed on the screen of the portable terminal 10 at a certain time point. In this state, it is assumed that a user performs a pinch operation (pinch-out) on the screen and that an area 108 is displayed on the screen. It is further assumed that an element having an id equal to 0120 is located at an upper end position of the area 108 and that an element having an id equal to 0140 is located at a lower end position of the area 108. When such a pinch operation is performed, the operation history storage unit 16 creates operation history information illustrated in FIG. 6. As the operation area item in the operation history information, a set of the id of the element located at an upper end of an area displayed at the time point when the pinch operation is completed ("begin:id=0120" in FIG. 6) and the id of the element located at a lower end thereof ("end:id=0140" in FIG. 6) is indicated. Note that, as information for identifying an area displayed at the time point when a pinch operation is completed, a set of elements respectively located at two opposite points on a diagonal line of the area (rectangle) (two opposite points respectively located at the upper left corner and the lower right corner, for example) may be used instead of the set of elements respectively located at an upper end and a lower end of the area.

FIG. 7 is a diagram for describing a change on a screen resulting from a tap operation. In the example in FIG. 7, on the web page 100, it is assumed that an area 110 is displayed on the screen of the portable terminal 10 immediately before a tap operation. An element having an id equal to 0150 is located at the upper left of the area 110, an element having an id equal to 0160 is located at the upper right thereof, the element having the id equal to 0200 is located at the lower left thereof, and an element having an id equal to 0190 is located at the lower right thereof. Regarding an element having an id equal to 0170 in the area 110, only the heading is displayed and the content is not expanded. In this state, when a user taps the heading of the element having the id equal to 0170, the content of an article corresponding to the element having the id equal to 0170 is expanded and displayed. An area displayed after the tapping is a display area 112 illustrated on the right of FIG. 7. In this example, as a result of the element having the id equal to 0170 having been expanded, the element having the id equal to 0200 is pushed off the display area 112. When such a tap operation is performed, the operation history storage unit 16 creates operation history information illustrated in FIG. 8. The item "type" in the operation history information is "tapping" and, as the item "operation area", the id of the element that has been tapped ("target:id=0170" in FIG. 8) is indicated.

Now, an example of a processing procedure performed by the operation history storage unit 16 and the print instruction unit 18 of the portable terminal 10 is described with reference to FIG. 9. This procedure is started when the web browser 12 downloads a web page in accordance with a user operation. When a web page is downloaded, the operation history storage unit 16 assigns a unique URL identifier to the web page and records URL information (see FIG. 4) that includes the URL identifier and the URL of the web page (step S10). The downloaded web page is displayed on the screen of the portable terminal 10 by the web browser 12. The operation history storage unit 16 waits for the user performing a touch operation on the screen (step S12). When a touch operation is performed, the screen operation recognition unit 14 detects the operation and communicates the detected operation to the web browser 12. The web browser 12 changes the display on the screen (scrolls, enlarges, or reduces the display or expands an article, for example) in accordance with the communicated operation. The operation history storage unit 16 obtains information about the type of touch operation (flick, pinch, or the like) and information about the operation area of the operation from the web browser 12 and records operation history information that includes the obtained information and an operation identifier uniquely assigned to the operation (step S14) (see FIG. 3, for example). The print instruction unit 18 waits for the user giving a print instruction (step S16). When the next screen operation is performed before a print instruction is given (step S12), the operation history storage unit 16 records operation history information about the screen operation (step S14). In this way, each time a screen operation is performed on a web page that is being displayed, operation history information about the operation is generated and recorded by the operation history storage unit 16. Pieces of operation history information about operations performed while a user is viewing the same web page include the same URL identifiers.

When a print instruction is input from a user, the print instruction unit 18 creates and transmits to the printer 20 print instruction data that includes URL information about the web page (see FIG. 4) currently being displayed, the URL information being stored on the operation history storage unit 16, and a group of pieces of operation history information including the same URL identifiers as that included in the URL information (step S18).

Figure 10:
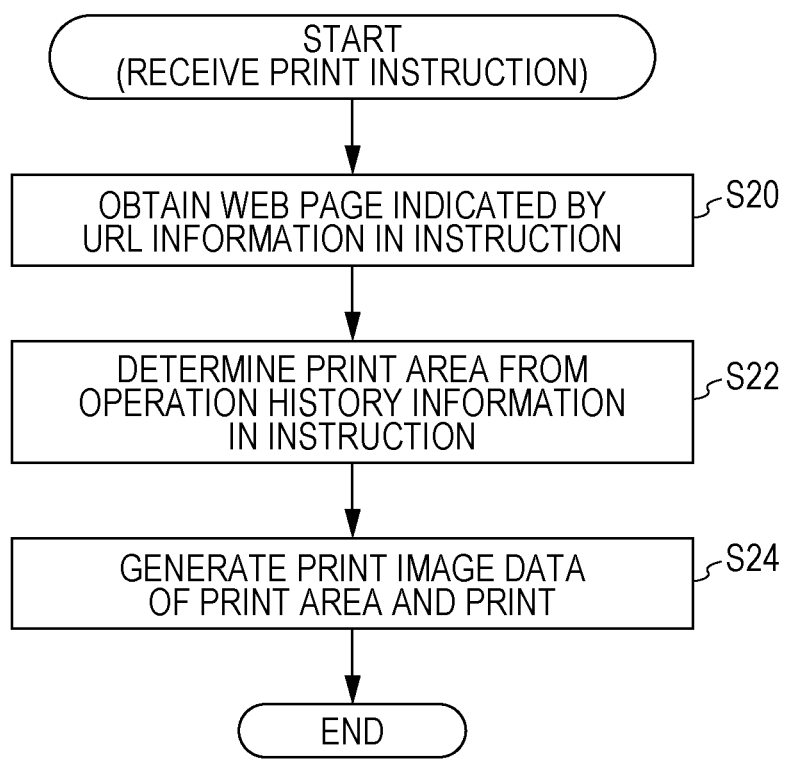
FIG. 10 is a flowchart illustrating an example of a processing procedure performed by a printer.

Now, an example of a processing procedure performed by the printer 20 is described with reference to FIG. 10. This procedure is started when the instruction receiving unit 22 receives print instruction data from the portable terminal 10. When the instruction receiving unit 22 receives print instruction data, the web page obtaining unit 24 obtains a web page indicated by URL information included in the print instruction data (step S20). The web page obtained by the printer 20 is a web page intended for a PC, for example. In contrast, a web page downloaded by the web browser 12 of the portable terminal 10 may be a page intended for a portable terminal (if the web site provides a page intended for a portable terminal and a page intended for a PC). Next, the print area determination unit 26 determines a print area on the web page from operation history information included in the print instruction data (step S22). Thereafter, the print processing unit 28 generates print image data that represents the print area on the basis of data of the web page and information about the determined print area, controls a print mechanism, and processes the print image data for printing on a sheet (step S24).

Figure 11:
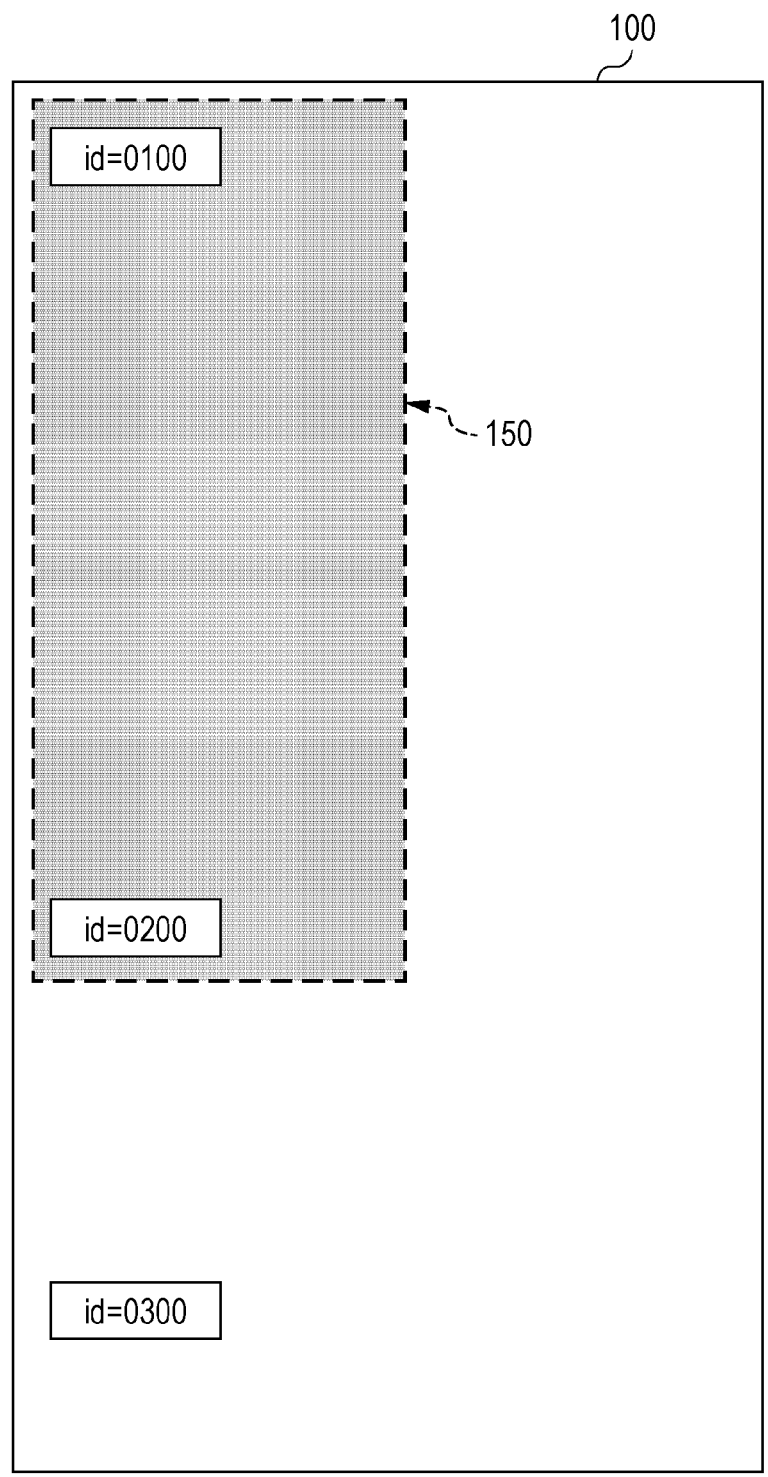
FIG. 11 is a diagram illustrating an example of a print area that corresponds to a flick operation.

For example, in a case where URL information included in print instruction data is that illustrated in FIG. 4 and operation history information included therein is that illustrated in FIG. 3 (flick operation history), an area 150 on the web page 100 is determined to be a print area, as illustrated in FIG. 11, as a result of determination in step S22. The area 150 is an area that starts with the element (id=0100) located at an upper end of an area displayed on the screen at the start of an upward flick operation, extends along the direction in which the operation is performed, and ends with the element (id=0200) located at a lower end of an area displayed on the screen at the end of the operation.

Note that in a case where the speed of a flick operation (the speed at which a finger moves) is fast, scrolling on the screen is so quick that the display area might not be substantially readable to a human during scrolling. By taking this into consideration, the "operation area" in a case of a flick operation may be limited to a group of elements displayed on the screen at the end of the flick operation (that is, at the time point when scrolling stops), and this group of elements may be regarded as the print area. Alternatively, the speed at which the display is moving in response to a flick may be calculated. If the moving speed is equal to or lower than a threshold, the user may be assumed to be able to read the display area during scrolling, and the "operation area" may be determined as illustrated in FIG. 3 (the print area may be determined as illustrated in FIG. 11). If the moving speed is higher than the threshold, the user may be assumed to be unable to read the display area during scrolling, and an area displayed at the time when scrolling stops may be determined to be the "operation area". Although the case of a flick operation is described above, for an operation, such as a swipe or dragging, in which a finger moves at a speed slower than that of a flick (that is, the scroll speed is slower than in a case of a flick) and in which the time point at which the finger is released from the screen is determined to be the time point at which the operation ends, similar processing may be performed.

Figure 12:
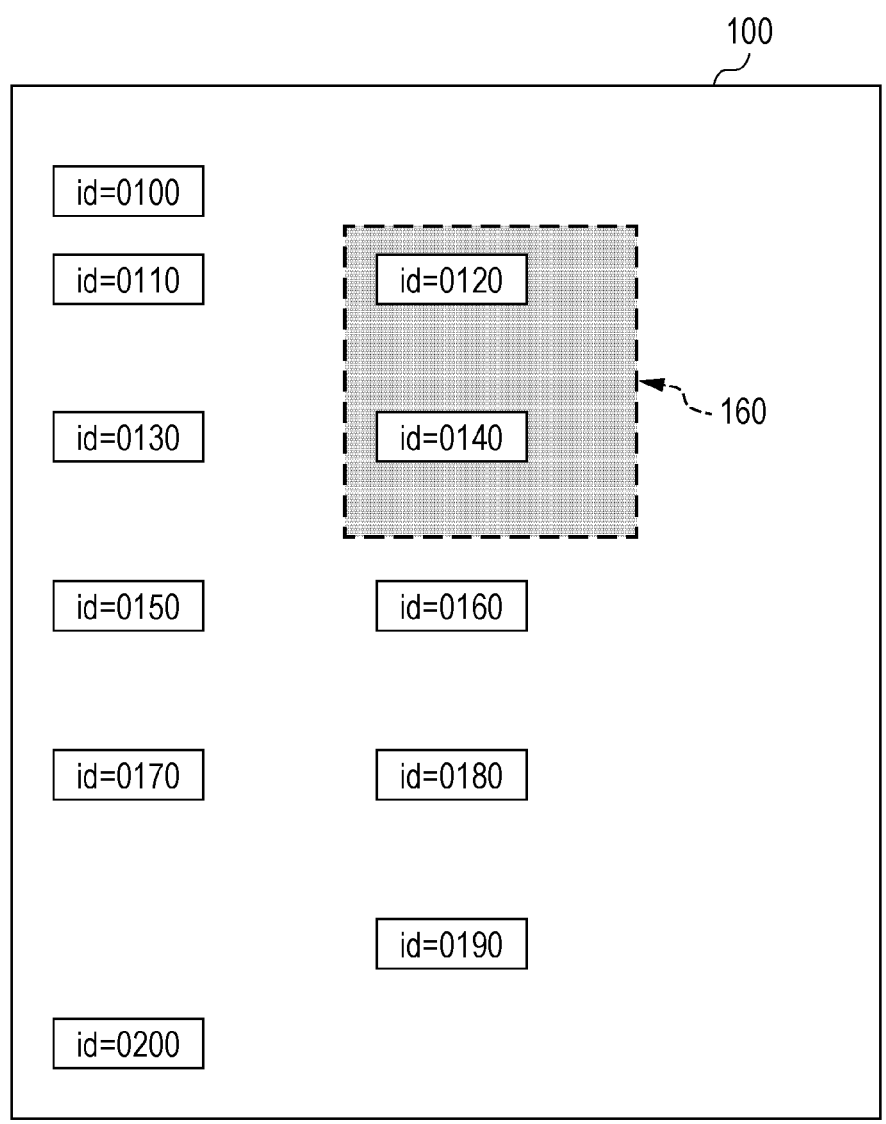
FIG. 12 is a diagram illustrating an example of a print area that corresponds to a pinch operation.

In a case where URL Information included in print instruction data is that illustrated in FIG. 4 and operation history information included therein is that illustrated in FIG. 6 (for a pinch operation), an area 160 on the web page 100 is determined to be a print area, as illustrated in FIG. 12, as a result of determination in step S22. The area 160 is an area that is constituted by the element located at an upper end and having the id equal to 0120, the element located at a lower end and having the id equal to 0140, the elements being indicated as the item "operation area" in the operation history information, and a group of elements located between the two elements (if any).

Figures 8, 9:
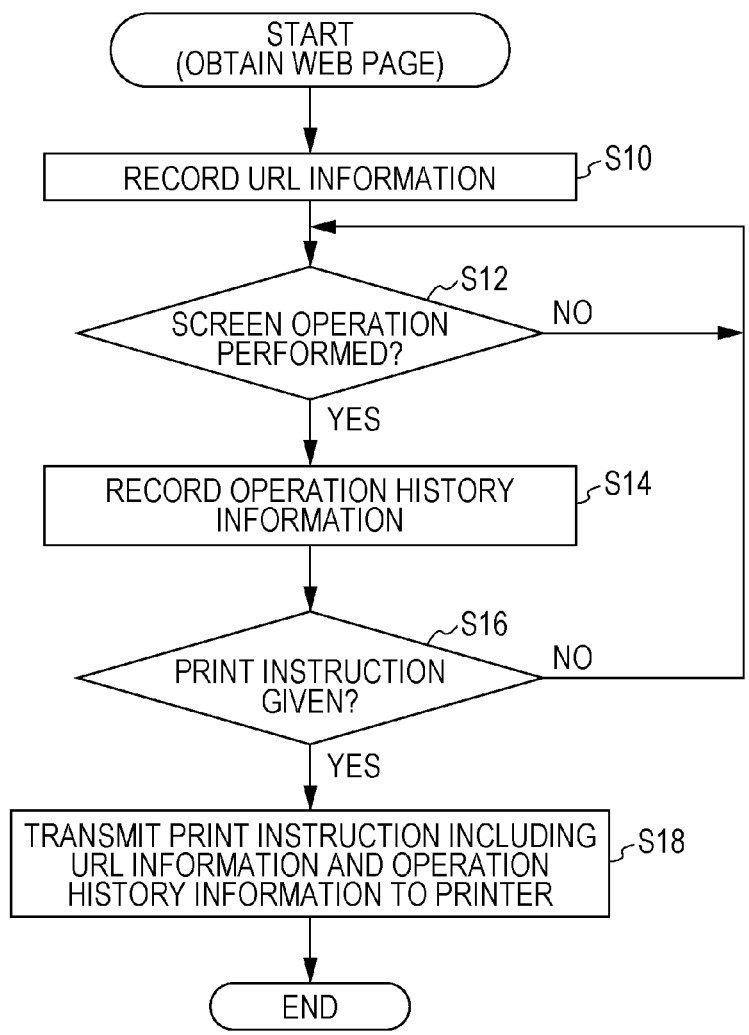
FIG. 8 is a diagram illustrating an example of operation history information about a tap operation.
FIG. 9 is a flowchart illustrating an example of a processing procedure performed by a portable terminal.
Figure 13:
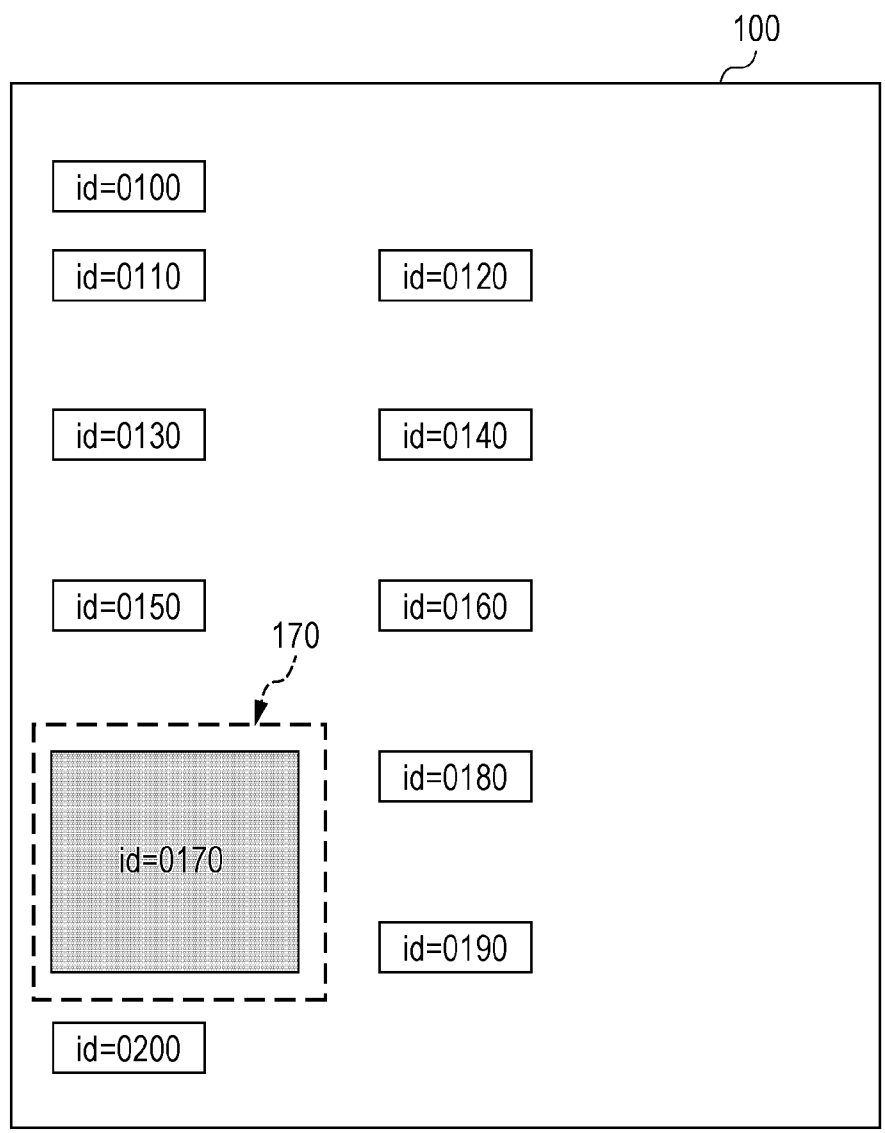
FIG. 13 is a diagram illustrating an example of a print area that corresponds to a tap operation.

In a case where URL Information included in print instruction data is that illustrated in FIG. 4 and operation history information included therein is that illustrated in FIG. 8 (for a tap operation), an area 170 on the web page 100 is determined to be a print area, as illustrated in FIG. 13, as a result of determination in step S22, the area 170 being an area for the content of an article corresponding to the element having the id equal to 0170 that is tapped (in this case, the content of an article is expanded in response to tapping on the heading of the element). In response to the tap operation, the display area 112 illustrated in FIG. 7 is displayed on the screen of the portable terminal 10. Although the display area 112 includes elements other than the tapped element (id=0170), the print area corresponding to the operation only includes the tapped element. This is because the tap operation is considered to explicitly indicate the user's intention of viewing the element.

The examples in FIG. 11 to FIG. 13 are examples each illustrating a print area that corresponds to a single screen operation. In a case where a user performs plural screen operations while viewing a web page, an area obtained by merging (combining) together print areas determined from pieces of operation history information about the respective screen operations is assumed to be a final print area.

As described above, in this exemplary embodiment, information about a screen operation (operation for changing a display area) performed while a user is viewing a web page is transmitted from the portable terminal 10 to the printer 20, and the printer 20 determines the print area on the web page from the information about the screen operation. Specifically, in this exemplary embodiment, in order to determine a print area from information about a screen operation, a method of determination in accordance with the type of screen operation is used. For example, in a case of a tap operation, the area for the content of an element that is tapped is determined to be the print area. In a case of a pinch operation, an area constituted by a group of elements displayed on the screen of the portable terminal 10 at the end of the operation is determined to be the print area. In doing so, an area that matches the user's intention of operation is printed.

Now, a modification is described. In this modification, a user's interval time after an operation for the display screen is recorded in operation history information recorded by the operation history storage unit 16, and information about the interval time is reflected in determination of the print area. Note that the "interval time" is a period from when an operation ends (more precisely, when a change in the screen display area resulting from an operation ends) until when the next operation is detected, and the screen display of the portable terminal 10 does not change during the period.

Figure 14:
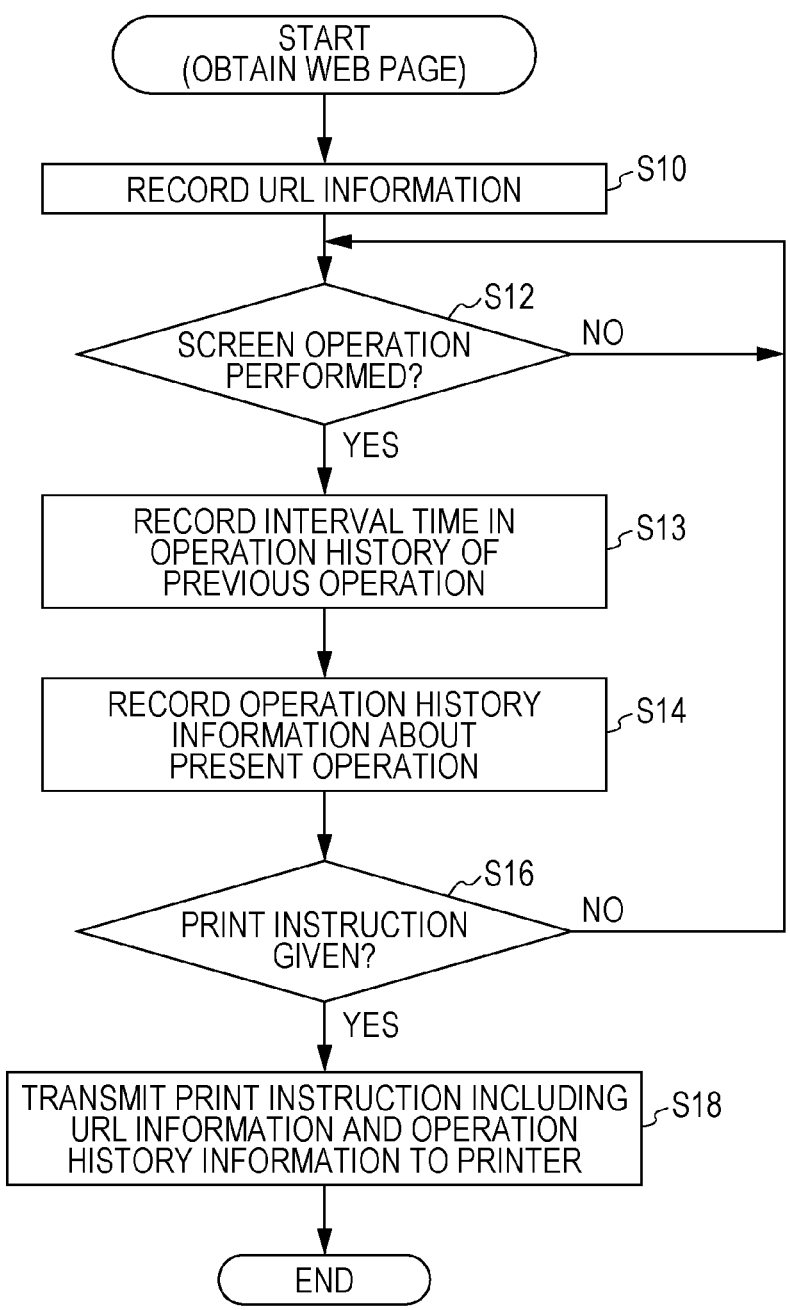
FIG. 14 is a flowchart illustrating an example of a processing procedure performed by the portable terminal according to a modification.

The system configuration for this modification may be similar to that illustrated in FIG. 1. A processing procedure performed by the operation history storage unit 16 (and the print instruction unit 18) of the portable terminal 10 is as illustrated in FIG. 14. The procedure illustrated in FIG. 14 is a procedure obtained by adding step S13 to the procedure according to the exemplary embodiment illustrated in FIG. 9.

In this procedure, when a screen operation is performed, the operation history storage unit 16 adds the value of the interval time to operation history information about an operation preceding the screen operation. In this modification, an interval time item is included in history information about each operation, as illustrated in FIG. 15. Therefore, the operation history storage unit 16 starts measuring the time at the time point when a screen operation ends (more precisely, when a change in the screen display resulting from the operation ends) and stops measuring the time at the time point when the next screen operation is started, for example. The time thus measured is assumed to be the "interval time" and is recorded in operation history information about the previous screen operation. The processes in steps other than step S13 may be similar to those in the procedure illustrated in FIG. 9.

The print instruction unit 18 transmits print instruction data including the operation history information that includes information about the interval time to the printer 20.

When determining a print area that corresponds to each piece of operation history information included in print instruction data, the printer 20 determines that a print area is not present for an operation for which the interval time is shorter than a threshold. That is, in this modification, if the interval time for a certain operation is short, it is assumed that the user has not read the screen display displayed as a result of the operation, and therefore, the area displayed on the screen is not assumed to be a print area.

Figure 16:
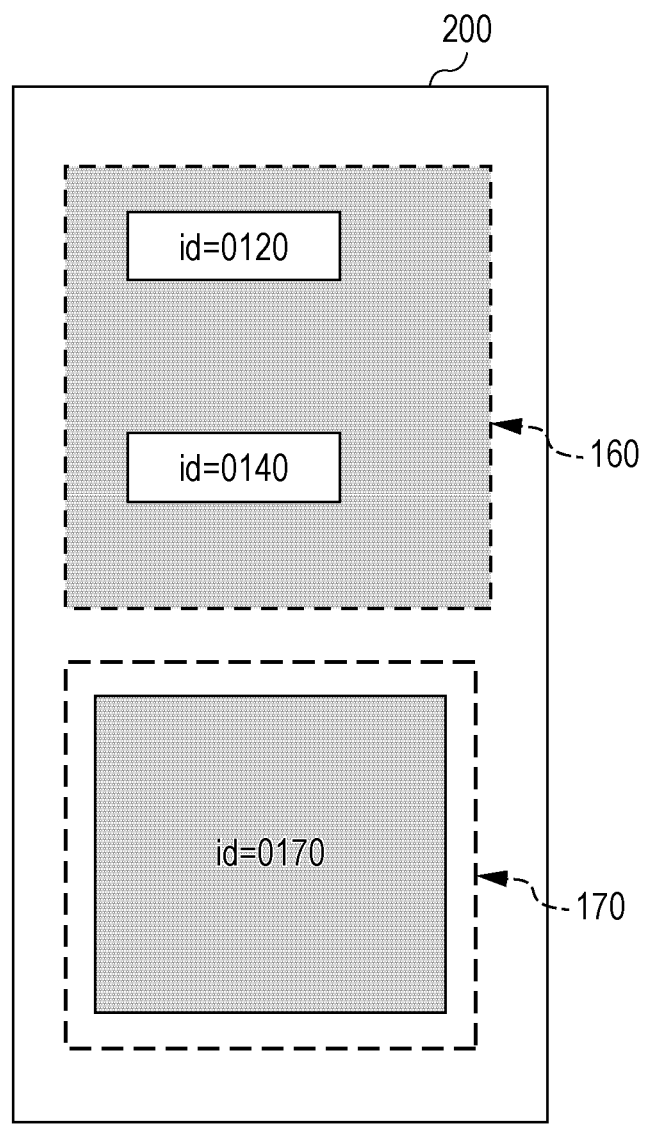
FIG. 16 is a diagram illustrating an example of print image data generated by the printer on the basis of the list illustrated in FIG. 15.

For example, it is assumed that a list of pieces of operation history information included in print instruction data is as illustrated in FIG. 15 and that a threshold of the interval time used to determine whether printing is to be performed is two seconds. In this case, the print area determination unit 26 determines that a print area is not present for the first and third flick operations "OPE001" and "OPE003" and determines print areas that respectively correspond to "operation areas" for the second pinch operation and the fourth tap operation. The final print area that is determined from the list is as illustrated in FIG. 16, for example. That is, in this case, print image data 200 obtained by merging together the print area 160 (see FIG. 12) that corresponds to the pinch operation "OPE002" and the print area 170 (see FIG. 13) that corresponds to the tap operation "OPE004" is processed for printing.

Although the case of printing a web page is described above, for example, a similar method is applicable to a case of printing electronic documents other than web pages.

The information processing mechanism of the portable terminal 10 and the printer 20 described above is implemented by causing a general-purpose computer to execute a program that represents processes performed by the functional modules of the apparatuses. Here, a computer has a circuit configuration in which hardware units, namely, a microprocessor, such as a central processing unit (CPU), a memory (primary memory), such as a random access memory (RAM) and read-only memory (ROM), a hard disk drive (HDD) controller that controls an HDD, various input/output (I/O) interfaces, a network interface that performs control for connection with a LAN and other networks, and so on, are connected to one another via a bus, for example. To the bus, a disk drive for reading and/or writing from/to portable disk recording media, such as compact discs (CDs) or digital versatile discs (DVDs), a memory reader/writer for reading and/or writing from/to portable nonvolatile recording media based on various standards, such as flash memories, and so on may be connected via the I/O interfaces, for example. The program in which the processes performed by the above-described functional modules are described is saved in a fixed storage device, such as an HDD, via a recording medium, such as a CD or a DVD, or via a communication system, such as a network, and installed on the computer. By the program stored in the fixed storage device being loaded to the RAM and executed by the microprocessor, such as a CPU, the group of functional modules described above is implemented.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing system comprising:
   a terminal; and a printer that is communicable with the terminal,
   the terminal comprising a first processor configured to execute:
      an operation history recording unit configured to detect an operation performed by a user for changing a display area of an electronic document displayed on a display screen of the terminal, and configured to record operation history information that includes type information about the operation, and
      an instruction transmitting unit configured to transmit, to the printer, print instruction information including the operation history information recorded by the operation history recording unit and document information for identifying the electronic document,
   the printer comprising a second processor configured to execute:
      an instruction receiving unit configured to receive the print instruction information from the terminal, and
      a print controller configured to determine, in accordance with the operation history information included in the received print instruction information, a print area of the electronic document identified by using the document information, and perform control so as to print the determined print area,
   wherein, in response to the operation being a tap operation performed on an element in the electronic document, the operation history recording unit is configured to record the operation history information that includes the type information indicating tapping, and identification information for identifying the element that is a target of the tap operation, and
   wherein, in response to the type information included in the operation history information indicating the tapping, the print controller is configured to determine the element in the electronic document which is indicated by the identification information included in the operation history information to be the print area that corresponds to the operation history information.

2. The printing system according to claim 1, wherein
   the operation history recording unit is configured to record a plurality of pieces of operation history information respectively for a plurality of operations performed by the user on the electronic document, and
   the print controller is configured to perform control so as to print an area obtained by combining together print areas that are respectively determined in accordance with the plurality of pieces of operation history information included in the print instruction information.

3. The printing system according to claim 1, wherein
   the operation history recording unit is configured to record and include in the operation history information an interval time during which the display area, which is an area displayed as a result of the operation, does not change, and
   the print controller is configured to determine that, for the operation history information that includes the interval time equal to or smaller than a threshold, the print area based on the operation history information is not present.

4. The printing system according to claim 2, wherein
the operation history recording unit is configured to record and include in each of the plurality of pieces of operation history information an interval time during which the display area, which is an area displayed as a result of a corresponding one of the plurality of operations, does not change, and
the print controller is configured to determine that, for a piece of operation history information among the plurality of pieces of operation history information which includes the interval time equal to or smaller than a threshold, the print area based on the piece of operation history information is not present.

5. The printing system according to claim 1, wherein the first processor is configured to, in response to the tap operation being performed on the element in the electronic document, expand the element to display an article or image corresponding to the element.

6. A printing system comprising:
a terminal; and a printer that is communicable with the terminal,
the terminal comprising a first processor configured to execute:
an operation history recording unit configured to detect an operation performed by a user for changing a display area of an electronic document displayed on a display screen of the terminal, and configured to record operation history information that includes type information about the operation, and
an instruction transmitting unit configured to transmit, to the printer, print instruction information including the operation history information recorded by the operation history recording unit and document information for identifying the electronic document,
the printer comprising a second processor configured to execute:
an instruction receiving unit configured to receive the print instruction information from the terminal, and
a print controller configured to determine, in accordance with the operation history information included in the received print instruction information, a print area of the electronic document identified by using the document information, and perform control so as to print the determined print area,
wherein the operation history recording unit is configured to record and include in the operation history information an interval time during which the display area, which is an area displayed as a result of the operation, does not change, and
wherein the print controller is configured to determine that, for the operation history information that includes the interval time equal to or smaller than a threshold, the print area based on the operation history information is not present.

* * * * *